United States Patent [19]

Vass

[11] 4,193,715

[45] Mar. 18, 1980

[54] MINE ROOF SUPPORT METHOD AND APPARATUS

[75] Inventor: George S. Vass, Summersville, W. Va.

[73] Assignee: The Eastern Company, Naugatuck, Conn.

[21] Appl. No.: 905,124

[22] Filed: May 12, 1978

[51] Int. Cl.² ............................................. E21D 20/02
[52] U.S. Cl. ........................................ 405/261; 85/62
[58] Field of Search ................... 61/45 B; 85/1 R, 62; 285/3; 403/2

[56] References Cited

U.S. PATENT DOCUMENTS

| | | | |
|---|---|---|---|
| 3,285,120 | 11/1966 | Kartiala | 85/62 |
| 3,877,235 | 4/1975 | Hill | 61/45 B |
| 4,023,373 | 5/1977 | Hipkins | 61/45 B |
| 4,051,683 | 10/1977 | Koval | 61/45 B |

*Primary Examiner*—David H. Corbin
*Attorney, Agent, or Firm*—Charles S. McGuire

[57] ABSTRACT

A rock formation, such as the roof of a mine tunnel, is reinforced by use of the apparatus of the invention to provide an anchor for a rock bolt which is tensioned to hold a support plate or similar structure in firm engagement with the face of the rock structure. The apparatus includes an elongated bar threadedly engaged with one end of an open, cylindrical coupling member, the other end of which is threaded to receive the rock bolt. One or more fixed members, preferably in the form of integral, die-formed ears, extend outwardly from the bolt shank a predetermined distance from the end of the threaded portion. Prior to threading into the coupling member the end of the bolt is inserted through an open, cylindrical collar having an internal radius greater than that of the bolt shank but less than the radial distance by which the fixed members project outwardly therefrom. The bolt is threaded into the coupling members until the collar is firmly engaged between the fixed members on the bolt shank and the end of the coupling member. Rotation of the bolt may thus be transmitted to the coupling member and bar to break a resin cartridge within a blind drill hole in the rock formation. After the resin grouting mix hardens sufficiently to prevent further rotation of the bar and collar sufficient torque is applied to the bolt to break at least one of the collar and fixed members, thereby permitting threaded advance of the bolt into the coupling member to bring a support plate into engagement with the surface of the rock formation surrounding the drill hole and tensioning the bolt to the desired degree.

9 Claims, 6 Drawing Figures

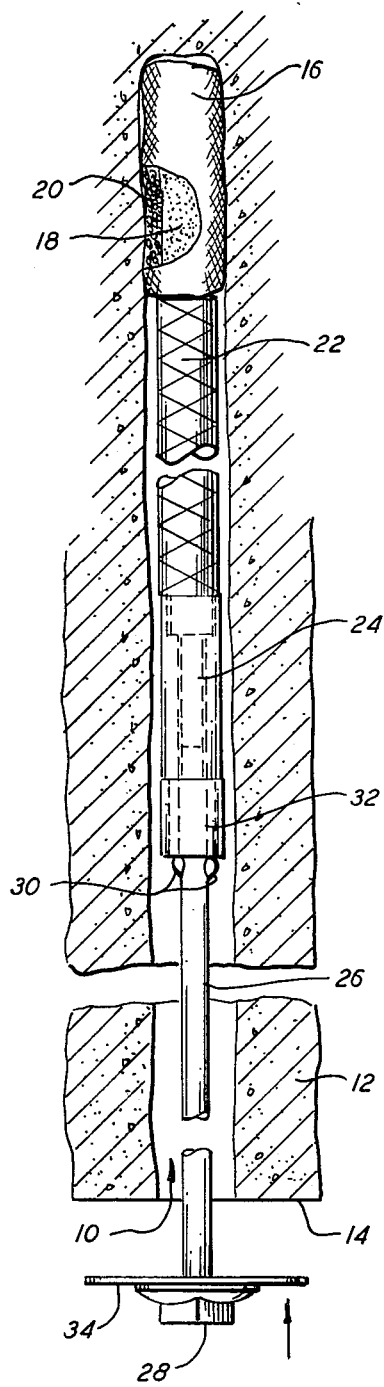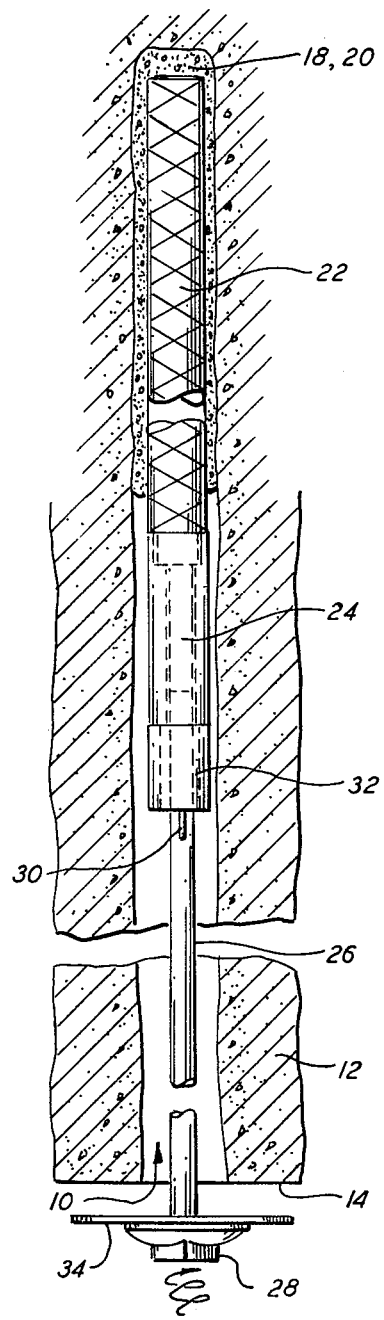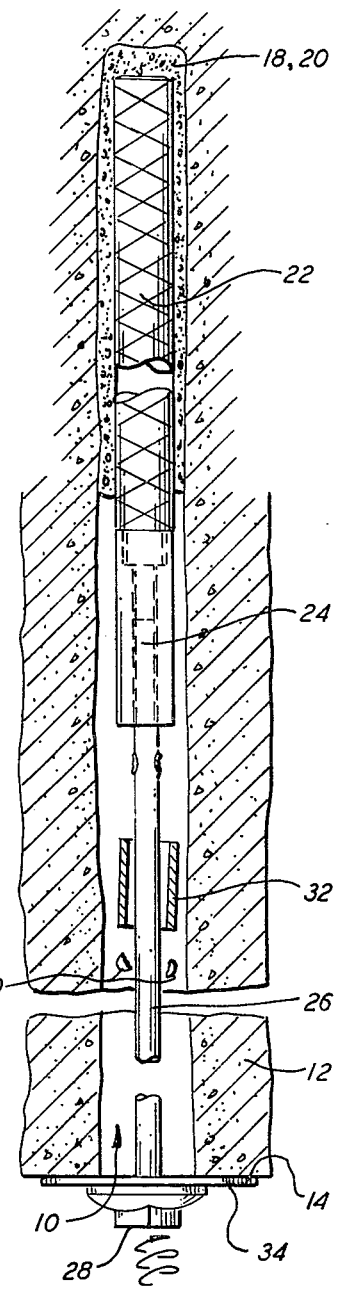

MINE ROOF SUPPORT METHOD AND APPARATUS

BACKGROUND OF THE INVENTION

The present invention relates to rock reinforcing systems and, more particularly, to roof bolting methods and apparatus wherein a bolt is tensioned by threading into an anchor which is secured within a drill hole by resin grouting.

Among the various types of mine roof support systems employing rock bolts anchored in bore holes are the purely mechanical or point-anchorage systems, the resin grouted systems, and combinations of the two wherein the bolts is tensioned by threading into a separate member which is anchored in the drill hole by resin grouting. In the usual mechanical anchorage systems an expansion anchor is placed on the threaded end of the bolt prior to insertion into the bore hole. As the bolt is advanced, the anchor expands to grip the inner surface of the drill hole and the bolt may be tensioned to the desired degree by applying sufficient torque. Although resin grouting systems wherein the bolt is anchored directly by a hardened resin mixture offer certain advantages, the bolt cannot be tensioned once the resin has set.

More recently roof support systems have been proposed wherein the advantages of the mechanical and resin anchorage systems are combined. Such systems are typified by U.S. Pat. No. 3,877,235 of Hill and U.S. Pat. No. 4,051,683 Koval, among others. In these systems an internally threaded member such as a nut or hollow collar is anchored within the drill hole by the resin mixture and the bolt is tensioned by threaded advancement into the anchored member. The internally threaded member is affixed to, or a portion of, an elongated bar which is surrounded by and anchored in the resin grouting. Stop means are structurally associated with the internally threaded member to limit the extent of threaded advance of the bolt. When the elongated bar and internally threaded member are anchored by the resin grouting and thus restrained against further rotation, the application of excess torque to the bolt serves to fracture the stop means within the internally threaded member and allow tensioning of the bolt.

Although performance of prior art roof bolting systems of the type outlined above is generally satisfactory, there remains the possibility that the stop means, being positioned at least partly within or upon the internally threaded member, may interfere with threaded advance of the bolt by damaging or becoming lodged in the threads. Also, placing the stop means in structural association with the internally threaded member requires additional fabricating operations which may be inconvenient and add to the cost of the assembly.

It is a principal object of the present invention to provide a novel roof bolting method, and apparatus for its employment, of improved reliability while being convenient and economical.

A further object is to provide novel methods and apparatus for reinforcing rock formations wherein a roof bolt is tensioned in a resin-anchored, internally threaded member which require no structural alteration of the internally threaded member.

Other objects will in part be obvious and will in part appear hereinafter.

SUMMARY OF THE INVENTION

In accordance with the foregoing objects, the invention comprises an assembly of elements which is advanced into a blind drill hole in the rock formation to break a destructible resin cartridge and mix the contents thereof to form a grouting anchoring the assembly in the drill hole. The assembly includes an elongated bar having a threaded portion at one end and joined thereby to an internally threaded, cylindrical coupling member. An otherwise conventional rock bolt is struck on each side with an appropriate die to form a pair of ears extending radially outward from each side of the bolt shank at a predetermined distance from the end of the threaded portion.

After the standard roof support plate is placed on the bolt, to be carried by the bolt head, the threaded end is inserted through an open, cylindrical collar having an inside radius greater than that of the bolt shank, but less than the radial distance by which the ears extend outwardly therefrom. The axial length of the collar is less than the distance from the end of the bolt to the ears so that the bolt may be threaded into the coupling member to an extent where the collar is engaged between the end of the coupling member and the ears on the bolt shank.

The resin cartridge is inserted into the blind drill hole in the rock formation, followed by the elongated bar and other elements assembled therewith as described above. The bolt head is engaged by standard bolting machinery and rotated as the assembly is advanced into the hole to break the resin cartridge and mix the contents thereof. Rotation is then stopped for a period of time sufficient to allow the resin mixture to harden to the point that the bar is firmly anchored, thus preventing further rotation of the bar and coupling member. The collar and/or the ears on the bolt shank are so designed and constructed that one or both is breakable upon application of excess torque to the bolt with the coupling member held stationary. Once the collar (and/or ears) is broken the bolt may be threadedly advanced into the coupling member and tensioned to the extent desired, maintaining the support plate in firm engagement with the face of the rock formation surrounding the drill hole.

BRIEF DESCRIPTION OF THE DRAWINGS

FIGS. 4–6 are a series of elevational views illustrating a second form of the invention as employed in steps corresponding to FIGS. 1–3, respectively.

DETAILED DESCRIPTION

Figures 1, 2, 3:
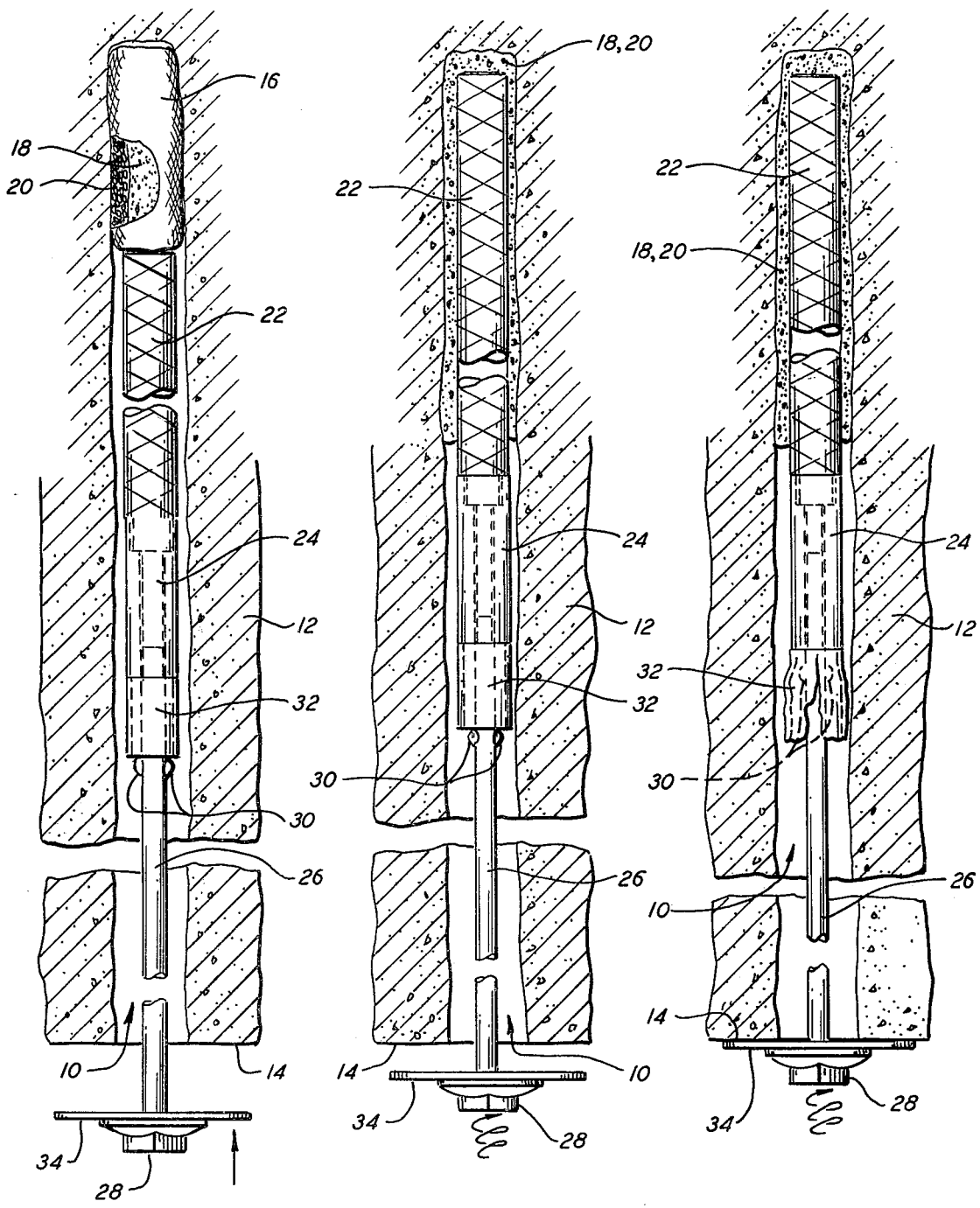
FIG. 1 is an elevational view of a first embodiment of the apparatus of the invention, illustrating a preliminary step in the use thereof to reinforce a rock formation shown in cross section.
FIGS. 2 and 3 are further elevational views of the apparatus of FIG. 1 showing subsequent steps in the employment thereof to reinforce the rock structure.

Referring now to the drawings, in FIGS. 1–3 is shown a first embodiment of the invention. A blind drill hole 10 has been formed with conventional drilling tools in a rock formation, shown in cross section through the hole and designated by reference numeral 12, for the purpose of installing elements which will serve to support surface 14 and generally reinforce the rock structure. Conventional resin cartridge 16 is formed in two compartments physically separating components 18 and 20 of a resin grouting mix. Such cartridges are commercially available from a variety of sources and include an epoxy or polyester resin as one of the components and a reaction agent such as a curing or hardening agent and/or a catalyst as the other. The two components remain in a semi-liquid or thixotropic phase until mixed, whereupon the resin begins to solidify. Curing and solidification continue until an extremely strong bond is formed.

As seen in FIG. 1, cartridge 16 has been placed in hole 12 and is supported therein on the free end of elongated bar 22, preferably of a type used in the reinforcement of concrete structures and therefore known as "rebar". The rebar has been turned down to a smaller diameter for a relatively short portion at one end. The smaller diameter portion is externally threaded for engagement in one end of an internally threaded, open, cylindrical coupling member 24. The juncture of the smaller and larger diameter portions of rod 22 form a stepped shoulder limiting the extent to which the rod may be threadedly advanced into coupling member 24.

The purpose of limiting threaded advance of rod 22 into coupling member 24 is to prevent rotation of member 24 in at least one clockwise direction when rod 22 is held rotationally stationary which may, of course, be accomplished by other means such as rigid attachment of the coupling member to the rod, or forming the two as an integral unit.

The end of coupling member 24 opposite the end in which bar 22 is engaged is also threaded internally toward the center for accepting the threaded end of a standard rock bolt having elongated shank 26 and head 28. For purposes of the present invention, one or more fixed members project radially outward from shank 26 a predetermined distance from the end of the bolt at which the threads begin. Although the fixed members may be provided in any desired practical manner and number, a convenient and economical method is to compress or pinch the sides of the shank with an appropriate die to form radially projecting ears 30 integrally with the shank, on diametrically opposite sides thereof. In fact, such ears are commonly formed on bolt shanks in connection with other applications; thus, many rock bolt manufacturers already have the tooling necessary for forming ears 30.

Before the threaded portion of shank 26 is advanced into the end of coupling member 24 it is inserted through open, cylindrical collar 32. The internal radius of collar 32 is greater than that of shank 26 but less than the radial distance by which ears 30 project outwardly therefrom. Thus, shank 26 may be freely advanced through collar 32 until the latter is contacted by ears 30. The axial length of collar 32 is less than the distance by which ears 30 are spaced from the end of the threaded portion of shank 26, allowing the latter to be threaded into coupling member 24 for a short distance before collar 32 is firmly engaged between ears 30 and coupling member 24.

In operation, after hole 10 has been drilled to the appropriate dimensions, cartridge 16 is inserted therein, followed by the free end of bar 22 after joining the threaded ends of the bar and bolt to coupling member 24 with collar 32 engaged between ears 30 and coupling member 24. When cartridge 16 reaches the blind end of drill hole 10, as shown in FIG. 1, the bolt continues to be advanced, thereby forcing the end of bar 22 into cartridge 16 to fracture the walls thereof and allow components 18 and 20 to come into physical contact. The bolt is engaged by a standard roof bolting tool for advancement into the drill hole and is also rotated by the tool, thereby rotating bar 22 and mixing components 18 and 20, as seen in FIG. 2.

When mixing is complete, normally after less than a minute of rotation of the bolt after cartridge 16 is broken, rotation is stopped. The bolting tool is left in engagement with the bolt head, and after a period of time sufficient for the resin grouting mix surrounding bar 22 to harden rotation of the bolt is resumed. Further rotation of bar 22 and coupling member 24 is prevented, of course, due to the anchoring of the bar in the resin grouting. Thus, as bolt shank 26 is threadedly advanced into coupling member 24, either ears 30 or collar 32 is broken. In the embodiment illustrated in FIGS. 1–3 collar 32 is constructed of a material and dimensions such that it is cracked or broken by ears 30, as shown in FIG. 3, when bolt shank 26 is advanced upon application of a predetermined torque. Collar 32 may be of a suitable plastic material or a crushable or frangible metal, for example. Such materials are commonly available in the form of hollow tubing having dimensions suitable for use in the collar of the present invention. Thus, the only fabrication requires is cutting the standard tubing to the desired length.

Operation of the embodiment illustrated in FIGS. 4–6 is exactly the same as that described in connection with FIGS. 1–3. Rebar 22, coupling member 24, bolt shank 26 and collar 32 are assembled in the same manner and advanced into drill hole 10 following resin cartridge 16. After the cartridge is broken and its contents mixed and hardened about rebar 22, excess torque is again applied to bolt head 28. In this embodiment, however, ears 30 are broken away from bolt shank 26, as shown in FIG. 6. Since the ears no longer support collar 32, the latter may also slide down the bolt shank to rest on the top of support plate 34 which is held in form engagement with rock surface 14 by the tensioned bolt.

What is claimed is:

1. Apparatus for installation in a drill hole in a rock formation to fracture a resin cartridge and mix the contents thereof, said apparatus thereafter being firmly anchored in the drill hole by the hardened resin mixture and serving to reinforce the rock formation, said apparatus comprising:

(a) an elongated anchor bar;
(b) means carried by one end of said bar, and having an internally threaded portion coaxial with said bar, said bar and said bar-carried means including means limiting the extent to which said bar and bar-carried means may be relatively rotated in one direction;
(c) an elongated bolt having a head at one end and threaded from the other end for a portion of its length for advance into said internally threaded portion of said bar-carried means;
(d) at least one fixed element extending radially outward from said bolt at a predetermined distance from the end of said threaded portion;
(e) a hollow collar having an axial length less than said predetermined distance and greater than the distance from said fixed element to said threaded portion of said bolt, and an axial bore or larger radius than said bolt and smaller than the radial distance by which said fixed member extends outwardly therefrom; and
(f) one of said fixed element and said collar being breakable upon application to said bolt of a predetermined torque for threaded advancement into said internally threaded portion with said collar encircling said bolt between said bar-carried means and said fixed element while said bar is held rotationally stationary.

2. The invention according to claim 1 wherein two of said fixed elements are provided, extending outwardly from diametrically opposite points on said bolt.

3. The invention according to claim 1 wherein said fixed member is breakable to separate from said bolt upon application of said predetermined torque for threaded advancement of said bolt into said internally threaded portion with said fixed member in contact with said collar.

4. The invention according to claims 1 or 3 wherein said fixed member is formed integrally with said bolt by deforming a portion of the material thereof.

5. The invention according to claim 1 wherein said collar is breakable to allow advancement of said bolt into said internally threaded portion upon application of said predetermined torque.

6. A method of reinforcing a rock formation comprising the steps of:
  (a) drilling a blind hole of predetermined dimensions into a face of the rock formation;
  (b) inserting a destructible resin cartridge into said hole;
  (c) inserting an elongated anchor bar into said hole with the leading end of said bar engaging said cartridge;
  (d) said bar carrying on its trailing end means rotationally restrained in one direction with respect to said bar and having an internally threaded portion coaxial with said bar;
  (e) forming a rock bolt having a head on one end and threaded from the other end for a portion of its length for advance into said internally threaded portion of said bar-carried means;
  (f) forming at least one fixed element extending radially outward from said bolt at a predetermined distance from the end of said threaded portion;
  (g) forming an open, hollow collar having an axial length less than said predetermined distance and an axial bore of larger radius than said bolt and smaller than the radial distance by which said fixed element extends outwardly therefrom;
  (h) placing said collar over said other end of said bolt to rest upon said fixed element;
  (i) advancing said threaded end of said bolt into said internally threaded portion of said bar-carried means until said collar is engaged between said fixed element and said bar-carried means;
  (j) rotating said bolt, and thereby said bar, while advancing the same into said hole to break said resin cartridge and mix the contents thereof within the hole around said bar;
  (k) stopping rotation for a period of time sufficient for the resin mixture to harden about said bar;
  (l) applying sufficient torque to said bolt, as said bar is held stationary by the resin mixture, to break at least one of said fixed element and said collar as said bolt is threadedly advanced into said internally threaded portion of said bar-carried means; and
  (m) continuing rotation of said bolt to bring a support plate carried thereby into supporting contact with the face of the rock formation surrounding said hole.

7. The method according to claim 6 wherein said collar is broken as said bolt is advanced into said internally threaded portion of said bar-carried means.

8. The method according to claim 6 wherein said fixed element comprises an ear formed integrally with said bolt by compressing a portion thereof in a die.

9. The method according to claim 8 wherein said ear breaks away from said bolt as said bolt is advanced into said coupling member.

* * * * *